US006312801B1

(12) United States Patent
Kim et al.

(10) Patent No.: US 6,312,801 B1
(45) Date of Patent: Nov. 6, 2001

(54) ADHESIVE TAPE FOR ELECTRONIC PARTS

(75) Inventors: Soon Sik Kim; Kyeong Ho Chang, both of Seoul; Hwa Il Jin, Kyunggi-Do, all of (KR)

(73) Assignee: Saehan Industries Incorporation, Kyongsangbuk-Do (KR)

( * ) Notice: Subject to any disclaimer, the term of this patent is extended or adjusted under 35 U.S.C. 154(b) by 0 days.

(21) Appl. No.: 09/608,253

(22) Filed: Jun. 30, 2000

(51) Int. Cl.[7] .............................. B32B 7/10; B32B 27/00; B32B 27/38; B32B 9/00

(52) U.S. Cl. .................................. 428/355 CN; 428/343; 428/355 R; 428/413; 428/447; 428/354

(58) Field of Search ..................................... 428/413, 414, 428/446, 447, 448, 343, 355 R, 355 CN, 354; 427/387

(56) References Cited

U.S. PATENT DOCUMENTS 5,863,988 * 1/1999 Hashimoto et al. ................. 525/105
6,048,576 * 4/2000 Hwail et al. .......................... 427/208

* cited by examiner

*Primary Examiner*—Robert Dawson
*Assistant Examiner*—Michael J Feely
(74) *Attorney, Agent, or Firm*—Harrison & Egbert

(57) ABSTRACT

An adhesive tape which can bond electronic parts at the environs of a lead frame, such as leads, diepads and radiant plate semiconductor chips, to each other and is superior in adhesiveness, thermal resistance and electrical properties. The adhesive tape is produced by coating on one side or both sides of a thermal resistant film an adhesive composition including an acryl resin, a mixed epoxy resin of a bisphenol A-type epoxy resin and a cresol novolak epoxy or a phenol novolak epoxy resin, a maleimide compound containing at least two intramolecular maleimide groups, an aromatic diamine compound, an epoxy-containing liquid silicon resin and an organic or inorganic filler and drying it.

5 Claims, No Drawings

ADHESIVE TAPE FOR ELECTRONIC PARTS

BACKGROUND OF THE INVENTION

1. Field of the Invention

The present invention relates to an adhesive tape through which electronic parts at the environs of a lead frame, such as leads, diepads and radiant plate semiconductor chips, are bonded to each other.

2. Description of the Related Art

Conventional adhesive tapes for use in resin package semiconductor devices may be exemplified by lead frame-fixing adhesive tapes, adhesive tapes for radiant plates, and TAB carrier tapes. With regard to a lead frame-fixing adhesive cape, it is used to fix a lead of a lead frame, so as to enhance the production yield and productivity for the lead frame itself as well as in the whole semiconductor assembly process. Generally, the adhesive tapes are applied on lead frames by lead frame makers and these are used to mount semiconductor chips which are then packaged in a resin by semiconductor assemblers. With regard to these functions, the adhesive tapes for use in fixing lead frames are required to be superior in the reliability, the workability upon taping and the adhesiveness after work as well as to show thermal resistance sufficient to overcome the heating in the assembly process of semiconductor devices.

Examples of the conventional adhesive tapes for these purposes include those in which polyacrylonitrile, polyacrylate or an acrylonitrile-butadiene copolymer alone or in combination with thermosetting resins is coated on thermal resistant support films, such as polyimide films. Recently, the package structures of semiconductor devices, however, have become complex owing to the requirement for multi-pin structure and heat radiation in the semiconductor devices and the organic materials used in the adhesive tapes have been strictly required to be superb in electrical, physical and thermal properties and in handling. Conventional adhesive tapes do not meet the requirements for sufficient thermal properties, dimensional stability and electrical properties. Particularly, when lead pins are bonded to heat sinks or connected to semiconductor chips through conventional insulating tapes, there is a serious problem in that the metallic materials, such as lead frames, might be bent or damaged.

To solve the problems, U.S. Pat. Nos. 5,494,757 and 5,500,294 disclose liquid adhesives comprising a piperazinylethylaminocarbonyl-containing butadiene-acrylonitrile copolymer and a compound having at least two maleimide groups optionally in combination with a diamine-containing polysiloxane compound. These liquid adhesives can be adhered and cured at a relatively low temperature and have sufficient heat resistance and electrical properties, but suffer from a significant problem of generating a large quantity of out gas or being poor in water logging tolerance.

BRIEF OF THE INVENTION

It is an object of the present invention to overcome the problems encountered in prior art and to provide an adhesive tape suitable for use in fixing electronic parts, which can be adhered and cured at relatively low temperatures and is superior in thermal resistance, electrical properties, water logging tolerance and out gas generation.

In accordance with the present invention, the above object could be accomplished by a provision of an adhesive tape which is based on a heat resistant film on one side or both sides of which an adhesive composition comprising 100 weight parts of an acryl resin with an average molecular weight ranging from 100,000 to 2,000,000, containing at least one functional group selected from a carboxyl group, an alcohol group, a sulfonyl group, a glycidyl group, and an amino group, 20–500 weight parts of a bisphenol A-type epoxy resin and 10–200 weight parts of a cresol novolak epoxy or a phenol novolak epoxy resin, 10–200 weight parts of a maleimide compound having at least two intramolecular maleimide groups, an aromatic diamine compound, and an epoxy-containing liquid silicon resin.

DETAILED DESCRIPTION OF THE INVENTION

The present invention contemplates an adhesive composition comprising an acryl resin (component A), a mixed epoxy resin (component B) of a bisphenol A-type epoxy resin and a cresol novolak epoxy or a phenol novolak epoxy resin, a bismaleimide compound (component C), an aromatic diamine compound (component D), an epoxy-containing liquid silicon resin (component E) and an organic or inorganic filler (component F).

The acryl resin (component A) useful in the present invention ranges, in weight average molecular weight, from 100,000 to 2,000,000 and, in glass transition temperature, from −50 to 150° C. and contains at least one functional group selected from a carboxyl group, an alcohol group, a sulfonyl group, a glycidyl group, and an amino group. For example, if the weight average molecular weight is below 100,000, the resulting adhesive composition is poor in thermal stability, adhesiveness and thermal resistance. On the other hand, if the weight average molecular weight is over 2,000,000, poor solubility results, so that the solution is too viscous to be handled with ease.

The acryl resin is prepared by copolymerizing a mixture comprising 10–60 weight % of acrylonitrile, 20–80 weight % of alkyl acrylonitrile whose alkyl moiety contains 2–12 carbon atoms, and 0.1–20 weight % of a monomer with a double bond to at least one functional group selected from a carboxyl group, an alcohol group, a sulfonyl group, a glycidyl group and an amino group. Less than 0.1 weight % of the functional group-containing monomer deleteriously affects the adhesiveness and thermal resistance while, when the monomer is present at an amount of more than 20 weight %, poor stability in a solution state is obtained.

As for the mixed epoxy resin (component B) used in the present invention, it is obtained from a mixture of a bisphenol A-type epoxy resin and a cresol novolak epoxy resin or a mixture of a bisphenol A-type epoxy resin and a phenol novolak epoxy resin. Based on 100 weight parts of the component A, the bisphenol A-type epoxy is added at an amount of 20–500 weight parts and preferably 80–200 weight parts and the cresol novolak epoxy or phenol novolak epoxy is added at an amount of 10–200 weight parts and preferably 40–100 weight parts. If the bisphenol A-type epoxy is present at an amount of less than 20 weight parts, the resulting composition shows poor adhesiveness. On the other hand, if too much bisphenol A-type epoxy is used, low thermal resistance is given. Less than 10 weight parts of the cresol novolak epoxy or phenol novolak epoxy brings debasement into the thermal resistance of the composition. When used at an amount exceeding 200 weight parts, the cresol novolak epoxy or phenol novolak epoxy produces a problem in adhesiveness.

The bismaleimide resin (component C) useful in the present invention is a compound having at least two intramolecular maleimide groups, as represented by the following chemical formula I or II:

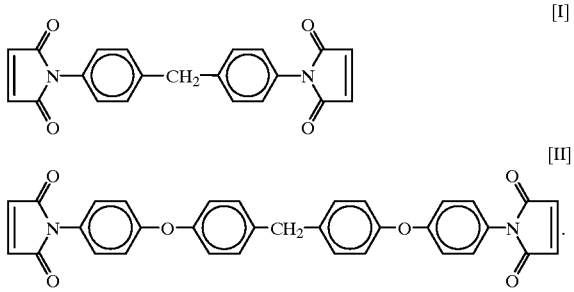

It is preferably used at an amount of approximately 10–200 weight parts based on 100 weight parts of the component A. For example, less than 10 weight parts of the component C causes deterioration in thermal resistance, modulus of elasticity after curing, and mechanical strength while too excessive amounts of the component C reduce the adhesiveness of the composition.

Compared with the quantity of the epoxy resin and bismaleimide resin, it is important to use a proper quantity of the component D (the aromatic diamine compound). Preferable amounts of the component D fall in the range of approximately 1–100 weight parts based on 100 weight parts of the sum of the components B and C. Excess or insufficient amounts of the component D cause a problem in solvent resistance, thermal resistance and electric resistance. In the present invention, it is recommended that aromatic diamine compounds superior in electrical properties, thermal resistance and chemical resistance are used. A curing agent may be used to promote a curing reaction.

As for the liquid silicon resin (component E), it has epoxy groups. The silicon moiety plays an important role in providing a chemical association within the adhesive, so that it is improved in thermal resistance, water logging tolerance and electric insulation, which leads to an increase in the durability and reliability of the adhesive tape. The component E is used at an amount of approximately 0.1–20 weight parts based on 100 weight parts of the component B. For example, less than 0.1 weight parts of the component E can not be expected to show an improvement in such functions. On the other hand, addition of more than 20 weight parts results in a decrease in adhesiveness.

The filler (component F) used in the present invention may be inorganic particles or organic particles. It is preferably used at an amount of approximately 1–50 weight parts based on 100 weight parts of the component A. For example, less than 0.1 weight parts of the filler makes the adhesive composition too adhesive to handle with ease, reducing the mechanical strength and elastic module of the adhesive. On the other hand, more than 50 weight parts cause a problem in adhesiveness. As an inorganic Filler, zinc oxide, silica, alumina or zirconia powder may be used. Examples of the organic filler include powedered acryl resins, polyamide resins and silicone.

The above components A to F are dissolved in a solvent so as to give a viscosity of 100–2,000 cps and preferably 300–1,000 cps.

On a thermal resistant film, the composition thus obtained is coated at such an amount that it remains 10–50 µm thick after drying. After being dried at 80–120° C. for 1–20 min, the composition on the backing film is applied by a release film and subjected to general processes for adhesive tapes in which semi-curing is carried out at 80–120° C. for 5–30 min, to give a thermal resistant adhesive tape for electronic parts.

The thermal resistant film available in the present invention may be prepared from a thermal resin, such as polyimide, polyphenylene sulfide, polyethylene terephthalate and polyethylene naphthalate. It is preferably approximately 5–100 µm thick and more preferably approximately 25–150 µm thick.

Examples of such a release film include polypropylene films, fluoro resin films, polyethylene films, polyethylene terephthalate films and paper. These films, if necessary, may be provided with more releasability by applying silicon resins thereto.

A better understanding of the present invention may be obtained in light of the following examples which are set forth to illustrate, but are not to be construed to limit the present invention

EXAMPLE I 100 weight parts of an acryl resin with a weight average molecular weight of 1,000,000, prepared by copolymerizing a monomer mixture comprising 30 weight % of acrylonitrile, 65 weight % of butyl acrylate and 5 weight % of methacrylic acid in the presence of a polymerization initiator, 100 weight parts of bisphenol A-type epoxy (with an epoxy equivalent of 100), 50 weight parts of cresol novolak epoxy (with an epoxy equivalent of 200), 25 weight parts of N',N'-(4,4'-diphenylmethane)bismaleimide, 25 weight parts of diaminodiphenyl methane, 2 weight parts of a liquid silicon resin containing epoxy groups, and 6 weight parts of zinc oxide with an average particle size of 2.0 µm were mixed, followed by the addition of methylethyl ketone and toluene to give an adhesive solution ranging, in viscosity, from 800 to 1,000 cps.

On a polyimide film 50 µm thick, such as that sold by DuPont under the brand name of "KAPTON(™)", the adhesive solution was applied thickly enough to allow the coating to be 20 µm thick after drying. After drying at 120° C. for 5 min, a polyethylene terephthalate film 38 µm thick was laminated on the coating to afford an adhesive tape.

EXAMPLE II 100 weight parts of an acryl resin with a weight average molecular weight of 1,200,000, prepared by copolymerizing a monomer mixture comprising 30 weight % of acrylonitrile, 65 weight % of butyl acrylate and 5 weight % of glycidyl acrylate in the presence of a polymerization initiator, 200 weight parts of bisphenol A-type epoxy, 100 weight parts of cresol novolak epoxy, 50 weight parts of N',N'-(4,4'-diphenylmethane)bismaleimide, 50 weight parts of diaminodiphenyl methane, 2 weight parts of a liquid silicon resin containing epoxy groups, and 6 weight parts of zinc oxide with an average particle size of 2.0 µm were mixed with each other and dissolved in methylethyl ketone and toluene to give an adhesive solution ranging, in viscosity, from 800 to 1,000 cps. Using this adhesive composition, an adhesive tape was made in the same manner as in Example I.

EXAMPLE III 100 weight parts of an acryl resin with a weight average molecular weight of 900,000, prepared by copolymerizing a monomer mixture comprising 40 weight % of acrylonitrile, 52 weight % of butyl acrylate, 3 weight % of hydroxyethylmethacrylate and 5 weight % of glycidylacrylate in the presence of a polymerization initiator, 200 weight parts of bisphenol A-type epoxy, 100 weight parts of cresol novolak epoxy, 50 weight parts of N',N'-(4,4'-diphenyl methane) bismaleimide, 50 weight parts of diaminodiphenyl methane, 2 weight parts of a liquid silicon resin containing epoxy groups, and 6 weight parts of zinc oxide with an average particle size of 2.0 μm were mixed with each other and dissolved in methylethyl ketone and toluene to give an adhesive solution ranging, in viscosity, from 800 to 1,000 cps. Using this adhesive composition, an adhesive tape was made in the same manner as in Example I.

COMPARATIVE EXAMPLE I 100 weight parts of an acryl resin with a weight average molecular weight of 1,200,000, prepared by copolymerizing a monomer mixture comprising 30 weight % of acrylonitrile, 65 weight % of butyl acrylate and 5 weight % of methacrylic acid in the presence of a polymerization initiator, 300 weight parts of bisphenol A-type epoxy, 50 weight parts of diaminodiphenyl methane, 2 weight parts of a liquid silicon resin containing epoxy groups, and 6 weight parts of zinc oxide with an average particle size of 2.0 μm were mixed with each other and dissolved in methylethyl ketone and toluene to give an adhesive solution ranging, in viscosity, from 800 to 1,000 cps. Using this adhesive composition, an adhesive tape was made in the same manner as in Example I.

COMPARATIVE EXAMPLE II 100 weight parts of an acryl resin with a weight average molecular weight of 1,200,000, prepared by copolymerizing a monomer mixture comprising 30 weight % of acrylonitrile, 60 weight % of butyl acrylate and 5 weight % of methacrylic acid in the presence of a polymerization initiator, 200 weight parts of bisphenol A-type epoxy, 100 weight parts of cresol novolak epoxy, 50 weight parts of N',N'-(4,4'-diphenylmethane)bismaleimide, 50 weight parts of diaminodiphenyl methane, and 6 weight parts of zinc oxide with an average particle size of 2.0 μm were mixed with each other and dissolved in methylethyl ketone and toluene to give an adhesive solution ranging, in viscosity, from 800 to 1,000 cps. Using this adhesive composition, an adhesive tape was made in the same manner as in Example I.

COMPARATIVE EXAMPLE III 100 weight parts of an acryl resin with a weight average molecular weight of 1,000,000, prepared by copolymerizing a monomer mixture comprising 40 weight % of acrylonitrile and 60 weight % of butyl acrylate in the presence of a polymerization initiator, 50 weight parts of bisphenol A-type epoxy, 200 weight parts of cresol novolak epoxy, 50 weight parts of N,N'-(4,4'-diphenylmethane)bismaleimide, 50 weight parts of diaminodiphenyl methane, 2 weight parts of a liquid silicon resin containing epoxy groups, and 6 weight parts of zinc oxide with an average particle size of 2.0 μm were mixed together and dissolved in methylethyl ketone and toluene to give an adhesive solution ranging, in viscosity, from 800 to 1,000 cps. Using this adhesive composition, an adhesive tape was made in the same manner as in Example I.

The adhesive tapes obtained in Examples and Comparative Examples were tested for various properties in the following manners and the test results are shown in Table 1, as described and presented below.

Adhesiveness

A thin copper piece was put on a heat plate maintained at 150° C. and then, pressurized thereon at a pressure of 5 kg/cm² for 0.5 sec by use of the tapes. After being dried at 175° C. for 1 hour in a hot blast oven, the tapes were measured for T-PEEL strength by a tensile strength tester.

Pyrolytic Temperature

Using a thermal gravity analyzer (DuPont V4, IC 2200), the temperatures at which the tapes lost 5% of their weights were measured.

Out gas

After being stored at 170° C. for 1 hour in a drier, the tapes were measured for the change in their weights.

Hygroscopic percentage

After being immersed in water at 23° C. for 1 hour, the tapes were measured for the change in their weights.

Modulus of Elasticity

After being dried for 1 hour at 170° C. and additionally for 1 hour at 250° C., the tapes were measured for modulus of elasticity by use of a tensile strength tester.

TABLE 1

| Tapes | Adhesiveness (g/cm) | Pyrolytic Temp. (° C.) | Out Gas (%) | Hygros. Percent (%) | Elast. Modulus (kg/mm²) |
|---|---|---|---|---|---|
| Exmp. I | 760 | 370 | 0.6 | 1.5 | 4,120 |
| Exmp. II | 740 | 395 | 0.6 | 1.5 | 4,570 |
| Exmp. III | 920 | 395 | 0.7 | 1.7 | 4,990 |
| C. Exmp. I | 730 | 340 | 1.1 | 1.6 | 3,650 |
| C. Exmp. II | 810 | 390 | 0.6 | 2.5 | 4,360 |
| C. Exmp. III | 250 | 395 | 0.6 | 1.7 | 4,860 |

Taken together, the data obtained in Examples and Comparative Examples demonstrate that the adhesive tapes according to the present invention are excellent in all of the tested properties, including adhesiveness, thermal resistance, and water logging tolerance while the conventional adhesive tapes prepared in Comparative Examples are poor in specific properties. For example, the adhesive tape of Comparative Example I has a disadvantage of generating a large quantity of out gas and of being low in modulus of elasticity. For Comparative Example II, the adhesiveness is particularly poor. A poor adhesiveness is found in the adhesive tape of Comparative Example III.

As described hereinbefore, the adhesive tape prepared according to the present invention is superior in physical properties, including adhesiveness, thermal resistance, water logging tolerance and the like, and in electrical properties, so that it is very useful for electronic parts, such as semiconductor devices.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

We claim:

1. An adhesive tape, comprising a heat resistant film as a base film on one side or both sides of which an adhesive composition is coated, said adhesive composition comprising:

(A) 100 weight parts of an acryl resin with a weight average molecular weight ranging from 100,000 to 2,000,000, containing at least one functional group selected from a carboxyl group, an alcohol group, a sulfonyl group, a glycidyl group, and an amino group;

(B) 20–500 weight parts of a bisphenol A-type epoxy resin and 10–200 weight parts of a cresol novolak epoxy or a phenol novolak epoxy resin;

(C) 10–200 weight parts of a maleimide compound having at least two intramolecular maleimide groups;

(D) an aromatic diamine compound; and (E) an epoxy-containing liquid silicon resin.

2. The adhesive tape as set forth in claim 1, wherein the acryl resin is prepared by copolymerizing a mixture comprising 10–60 weight % of acrylonitrile, 20–80 weight % of alkyl acrylonitrile whose alkyl moiety contains 2–12 carbon atoms, and 0.1–20 weight % of a monomer with a double bond to at least one functional group selected from a carboxyl group, an alcohol group, a sulfonyl group, a glycidyl group and an amino group.

3. The adhesive tape as set forth in claim 1, wherein the component (C) is a compound represented by the following chemical formula I or II:

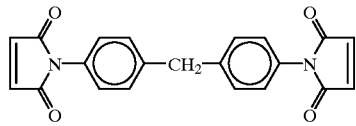
[I]

-continued

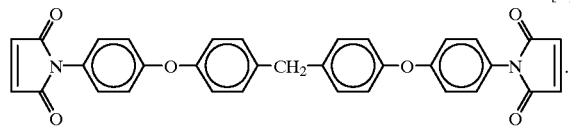
[II]

4. The adhesive tape as set forth in claim 1, wherein the component (D) is used at an amount of 1–100 weight parts based on 100 weight parts of the sum of the components (B) and (C).

5. The adhesive tape as set forth in claim 1, wherein the component (E) is used at an amount of 0.1–20 weight parts based on 100 weight parts of the component (B).

* * * * *